United States Patent [19]
Cutler

[11] Patent Number: 5,505,170
[45] Date of Patent: Apr. 9, 1996

[54] AIR INTAKE MANIFOLD

[75] Inventor: David K. Cutler, Plantation, Fla.

[73] Assignee: Cutler Induction Systems, Inc., North Miami Beach, Fla.

[21] Appl. No.: 319,294

[22] Filed: Oct. 6, 1994

[51] Int. Cl.⁶ .............................................. F02M 35/104
[52] U.S. Cl. ........................................................ 123/184.34
[58] Field of Search ................... 123/184.34, 184.24, 123/184.42, 184.47, 184.53, 184.51, 184.32, 184.55

[56] References Cited

U.S. PATENT DOCUMENTS

| | | | |
|---|---|---|---|
| 2,892,453 | 6/1959 | Stoll | 123/452 |
| 2,909,165 | 10/1959 | Dolza | 123/184.34 |
| 3,561,408 | 2/1971 | Weland | 123/184.34 |
| 3,744,463 | 7/1973 | McFarland, Jr. . | |
| 3,783,843 | 1/1974 | McFarland, Jr. . | |
| 3,930,473 | 1/1976 | McFarland, Jr. . | |
| 3,930,483 | 1/1976 | Blisko . | |
| 3,931,811 | 1/1976 | McFarland, Jr. . | |
| 4,109,619 | 8/1978 | Morris . | |
| 4,210,010 | 7/1980 | Shaffer . | |
| 4,210,107 | 7/1980 | Shaffer | 123/184.34 |
| 4,318,371 | 3/1982 | McFarland . | |
| 4,461,248 | 7/1984 | McFarland, Jr. . | |
| 4,466,389 | 8/1984 | Arkus-Duntov . | |
| 4,643,138 | 2/1987 | Ruf et al. | 123/184.34 |
| 4,805,564 | 2/1989 | Hudson, Jr. . | |
| 4,872,424 | 10/1989 | Carnes . | |
| 4,977,866 | 12/1990 | Wilkins . | |
| 5,003,932 | 4/1991 | Duncan . | |
| 5,063,885 | 11/1991 | Yoshioka | 123/184.34 |

FOREIGN PATENT DOCUMENTS

404272464  9/1992  Japan .

Primary Examiner—Marguerite Macy
Attorney, Agent, or Firm—Holland & Knight

[57] ABSTRACT

An air intake manifold comprises a manifold body having a plenum formed with a convexly-curved floor, opposed sidewalls and a radiused inlet which collectively define a plenum interior. A number of air passageways or runners each have an inlet at the plenum interior and an outlet connected to one cylinder of the internal combustion engine where a fuel injector is mounted to combine atomized fuel with the flow of air through such runners. An air guide extends outwardly from the plenum floor in a generally convexly arcuate shape which is effective to smoothly direct the flow of air entering the plenum interior into each of the runners so that turbulence within the runners is substantially reduced thus allowing a maximum amount of air to flow into the cylinders of the engine at both low engine speeds and high engine speeds.

16 Claims, 5 Drawing Sheets

AIR INTAKE MANIFOLD

FIELD OF THE INVENTION

This invention relates to air intake manifolds for fuel injected, internal combustion engines, and, more particularly, to an air intake manifold capable of generating sufficient air flow volume and velocity to maximize torque output at both low and high speeds of operation of the internal combustion engine.

BACKGROUND OF THE INVENTION

Historically, the design of intake manifolds for internal combustion engines has involved the sacrifice of torque output and performance at different engine speeds. This is because optimum air flow patterns and volumetric requirements of an engine at one engine speed and load, differ considerably from optimum conditions at other engine speeds and loads. It has proven difficult to obtain one manifold design suitable for a wide range of engine speed requirements.

Air intake manifolds generally comprise a manifold body formed with a plenum having an inlet connected to an air or throttle valve. A number of air passages or runners are formed in the manifold body having an inlet at the plenum interior and an outlet connected to one of the cylinders of the engine. A flow of air is directed into the plenum interior and then distributed into the several runners for transmission to the cylinders of the engine where it is intermixed with fuel supplied by fuel injectors. Air-fuel intake manifolds are generally similar in construction except the plenum inlet is connected to a fuel injection or carburation system which discharges a mixture of fuel and air into the plenum for distribution to the runners.

In an engine intended to operate predominantly at high speeds, air and air-fuel intake manifolds have generally been designed with runners having a relatively large cross section. This is because at high operational speeds the engine requires a substantial quantity of air and fuel to support combustion, and thus a large cross sectional area must be provided within each runner to produce sufficiently high flow rates of air or air-fuel therethrough. While this design provides acceptable efficiency and torque at high engine speeds, the performance of the engine while idling or at lower "street" speeds with manifolds of this type is extremely poor. The large area runners make it virtually impossible to obtain the desired air velocity and air volume at lower speeds, and therefore torque output is reduced, with an accompanying drop in fuel economy and an increase in hydrocarbon emissions.

Essentially the reverse problem occurs with intake manifolds designed for engines to be operated primarily at lower speeds. In these manifold designs, the runners of the manifold are typically formed with relatively small cross-sectional areas so that higher velocity flows of air and/or an air-fuel mixture can be obtained at lower engine speeds. But because of the comparatively small size of the runners in such manifolds, insufficient flows of air and/or an air-fuel mixture are provided at high engine speeds thus severely limiting the engine performance and torque output. Consequently, the design problem has been one of obtaining the desired engine performance and torque output through more than a narrow range of engine speeds.

SUMMARY OF THE INVENTION

It is therefore among the objectives of this invention to provide an air intake manifold for fuel-injected, internal combustion engines which enables the engine to generate high torque at both low engine speeds and high engine speeds, which increases engine efficiency, which reduces fuel consumption and which reduces hydrocarbon emissions.

These objectives are accomplished in an air intake manifold which comprises a manifold body having a plenum formed with a convexly-curved floor, opposed sidewalls and a radiused inlet which collectively define a plenum interior. A number of air passageways or runners each have an inlet at the plenum interior and an outlet connected to one cylinder of the internal combustion engine where a fuel injector is mounted to combine atomized fuel with the flow of air through such runners. An air guide extends outwardly from the plenum floor in a generally convexly arcuate shape which is effective to smoothly direct the flow of air entering the plenum interior into each of the runners so that turbulence within the runners is substantially reduced thus allowing a maximum amount of air to flow into the cylinders of the engine at both low engine speeds and high engine speeds.

One aspect of this invention is predicated upon the concept of obtaining improved engine performance and torque output over a wide range of engine speeds by transferring the air flow through the intake manifold to the cylinders of the engine with minimal turbulence. This goal is achieved in the subject invention by the radiused lip or inlet of the plenum, and by configuration of the air guide and the runners of the air intake manifold.

In the presently preferred embodiment, the air guide is formed with a base portion coincident with the floor of the plenum, an uppermost portion spaced from the base portion and an intermediate portion extending therebetween. The air guide resembles a "mound" whose cross-section decreases from the base portion to the uppermost portion thereof in a generally convexly-curved shape. Additionally, a smooth transition is provided between the radiused inlet of the plenum and the air guide, as well as between the base portion of the air guide and the inlet to each of the runners formed in the manifold body. Preferably, each runner has a floor, ceiling and opposed sidewalls wherein at least the floor and ceiling have a radius or convexly-curved shape at the inlet thereof which corresponds to the curved shape of the air guide. As a result, air entering the interior of the plenum is directed from the curved or radiused inlet of the plenum along the convexly-curved surface of the air guide, and is then smoothly guided into the correspondingly shaped inlet of each runner thus substantially reducing turbulence in the air flow within each runner.

The above-described configuration of the plenum inlet, air guide and runners within the manifold body is effective to increase engine performance and output torque at both low and high engine speeds. This is because turbulence in the air flow through the manifold is substantially reduced, compared to known manifold designs, and thus the cross-section of the runners herein can be of moderate size to accommodate a wide range of engine speeds. As described above, prior manifold designs intended for optimum engine performance at high speeds usually employ runners having comparatively large cross-sectional areas so that sufficient air flow volume and air velocity can be provided to the engines operating at high speeds. Although turbulent flow of air, and/or an air-fuel mixture, is obtained in prior manifold designs, the cross-section of the runners is sufficiently large to nevertheless deliver enough air and/or air-fuel mixture therethrough to satisfy high speed demands. But runners having a large cross-section also produce poor engine performance, increased fuel consumption and increased emissions at low engine speeds because no appreciable air velocity can be obtained therethrough at such speeds. This problem is avoided in the subject invention by creating a non-turbulent, more laminar flow through moderate sized runners. The plenum inlet, air guide and runner construction collectively reduce turbulence and thus a large air flow can be transmitted through the runners even though they are smaller in size than the runners used in other, conventional manifolds. Because little turbulence is produced within the runners herein, substantially all of the cross-sectional area of each runner is available for air flow therethrough, and a flow of air is thus obtained through the smaller runners of this invention which is comparable to the air flow through larger runners of prior art manifolds. On the other hand, because the runners of this invention are of moderate size, engine performance and torque output at lower engine speeds is substantially improved. The moderately-sized runners of this invention maintain the required velocity and flow rate of the air therethrough, even at low engine speeds, thus increasing fuel efficiency and decreasing emissions without sacrificing torque output.

Another aspect of this invention is predicated upon the concept of introducing atomized fuel, e.g. gasoline, further into the cylinders of an internal combustion engine than is achieved with conventional fuel injection systems. The manifold body of this invention is formed with a boss at the outlet of each runner, and each boss mounts a fuel injector. The bosses are oriented such that when the manifold is bolted to the block of an internal combustion engine, the centerline of the outlets of each fuel injector carried by such bosses is offset from the centerline of the cylinder head port into which the atomized fuel is injected. These cylinder head ports, in turn, are connected to the cylinders of the engine. This offset enables the conical shaped fan of fuel emitted from each fuel injector to travel a greater distance into the interior of the cylinder head port before the fuel contacts a wall thereof, compared to prior fuel injector systems. The effect of directing the fuel a further distance into the cylinder head ports before it contacts a sidewall thereof is to enhance atomization of the fuel thus reducing fuel consumption and reducing emissions because the fuel is more completely burned in the cylinders. Atomization is improved because the fuel is in contact with air entering the cylinder head ports for a longer period of time before contacting the sidewalls thereof, which creates a shearing action which breaks up larger fuel droplets and more thoroughly intermixes the fuel with the air so that it can be transferred into the engine cylinder for combustion.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
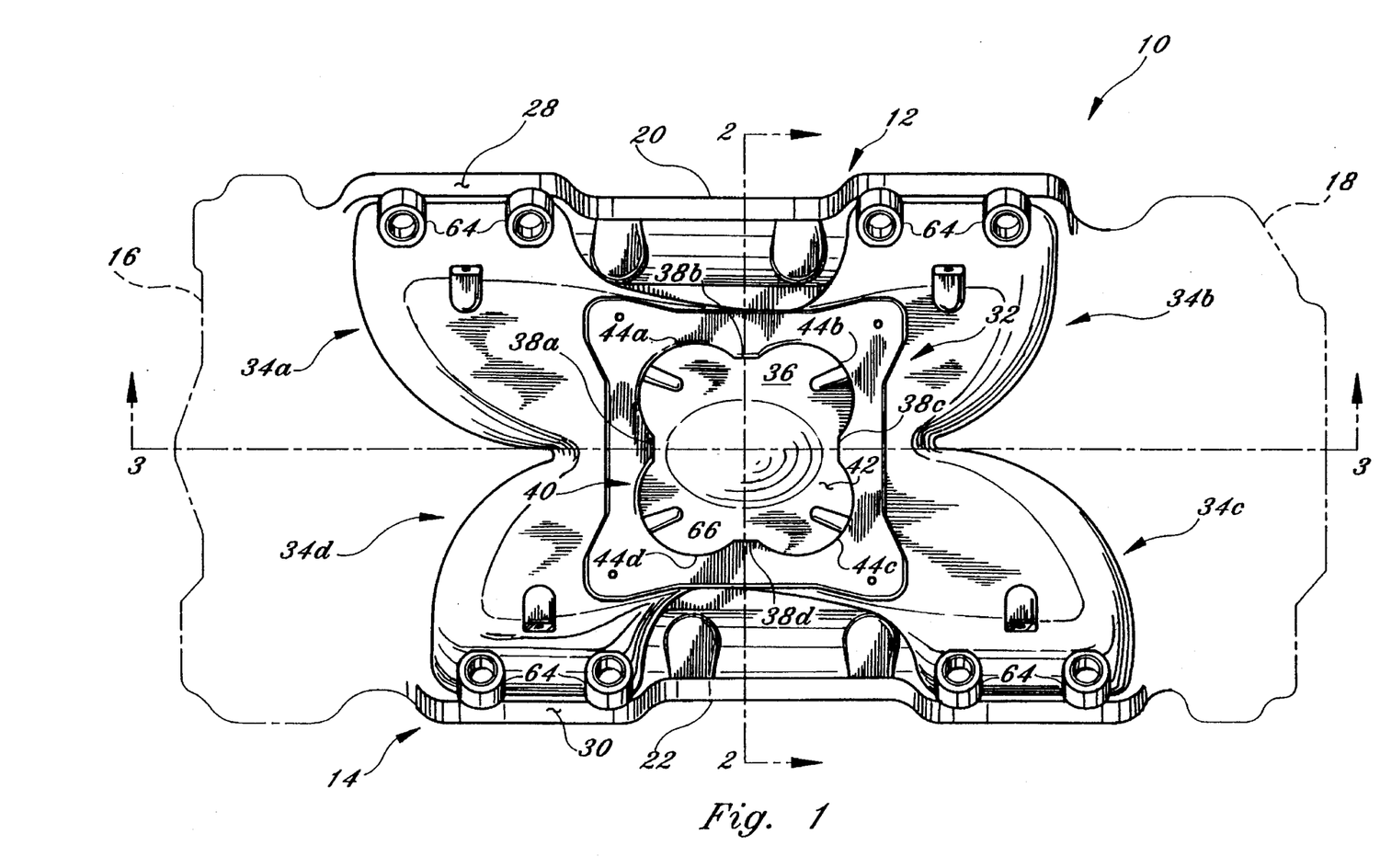
FIG. 1 is an overall plan view of the air intake manifold of this invention.
Figure 2:
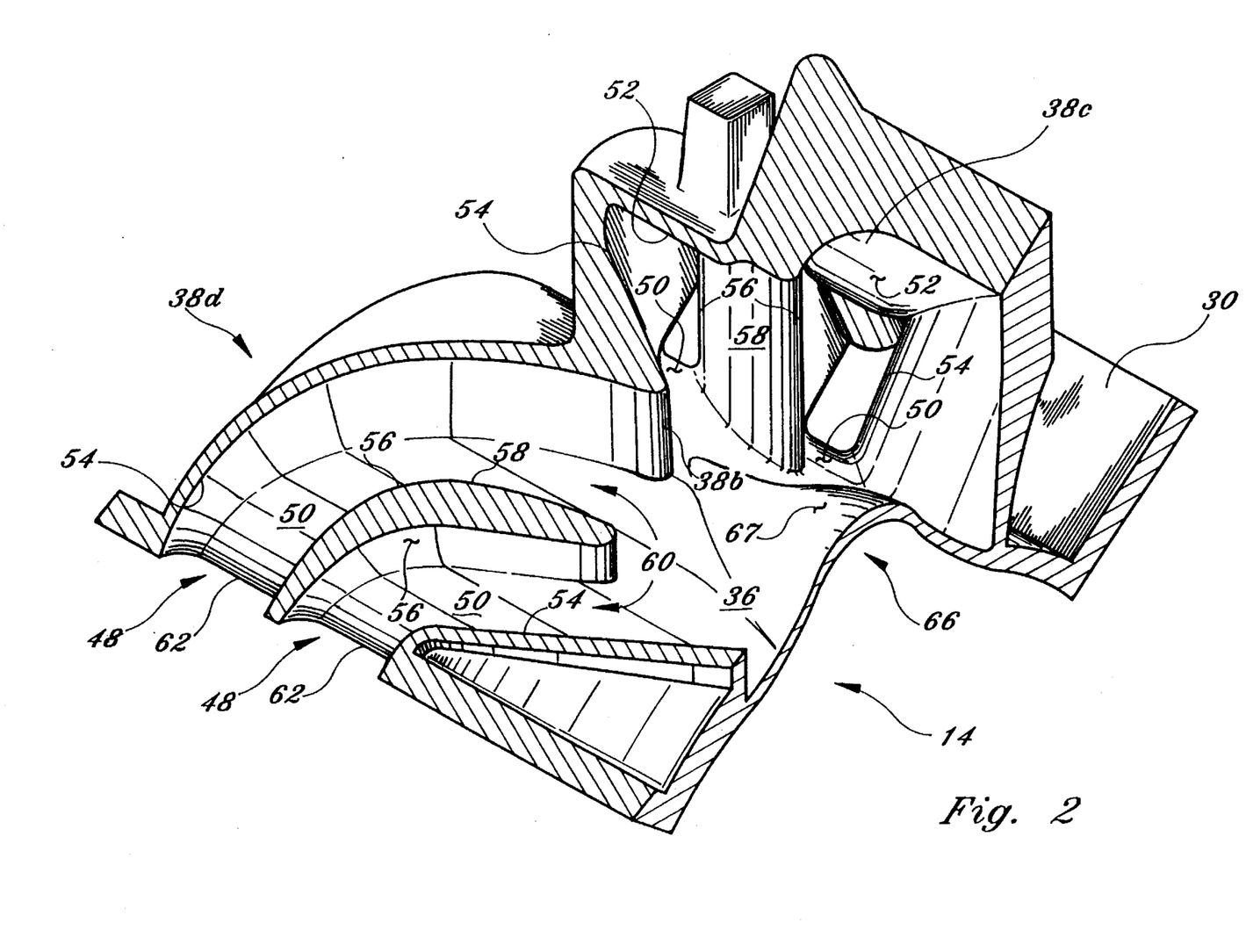
FIG. 2 is a partially cut away, cross-sectional view taken generally along line 2—2 of FIG. 1.
Figure 6:
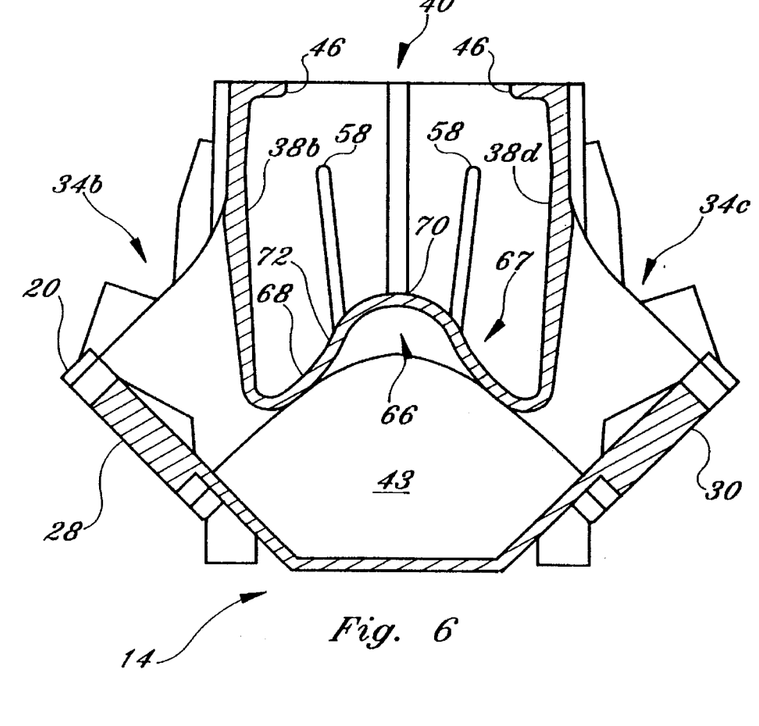
FIG. 6 is a cross-sectional view of a portion of the plenum illustrating another view of the air guide of this invention.

Referring now to FIG. 1, the air intake manifold 10 of this invention includes a manifold body 12 having a substantially rectangular-shaped base 14 formed with opposed ends 16, 18 and opposed sides 20, 22. As best seen in FIGS. 2 and 6, a portion of the base 14 along each side 20, 22 is angled upwardly from the remainder of the base 14 forming upwardly tapering arm portions 28 and 30.

The manifold body 12 is also formed with a plenum 32 connected to one end of four air transfer passages 34a–d. The opposite end of air transfer passages 34a and 34b mount to the arm portion 28 of base 14, and the opposite end of air transfer passages 34c and 34d mount to arm portion 30. The plenum 32 is formed with a floor 36, sidewalls 38a–d, and, a plenum inlet 40, which collectively define a plenum interior 42. As best seen in FIG. 6, the floor 36 of plenum 32, and the base of each air transfer passage 34a–d, are convexly-curved in shape in a direction between the sides 20, 22 of base 14, thus forming a raised area or air space 43 between the center of base 14 and the plenum 32. In the presently preferred embodiment, the plenum inlet 40 has the general shape of a cloverleaf with four substantially semi-circular lobes 44a–d each of which has a lip 46 formed with a substantially 90° radius. See FIG. 6.

Figure 3:
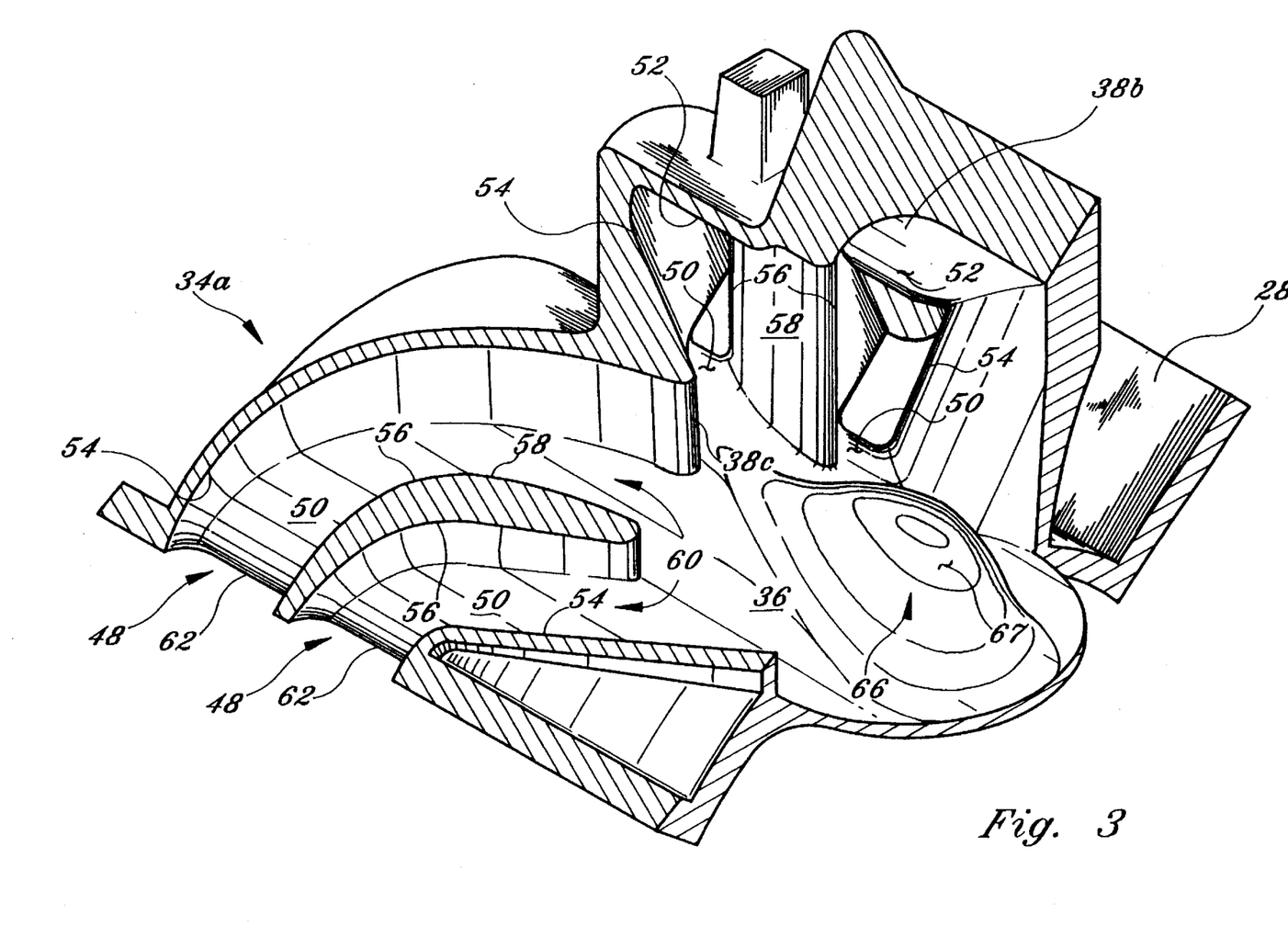
FIG. 3 is a partially cut away, cross-sectional view taken generally along line 3—3 of FIG. 1.

As best shown in FIGS. 2 and 3, each of the air transfer passages 34a–d formed in the manifold body 12 is divided into a pair of runners 48 which extend from the plenum interior 42 to the sides 20 or 22 of manifold body 12. Each runner 48, in turn, is comprised of a floor 50, ceiling 52, a side wall 54 formed by a wall of one of the air transfer passages 34a–d, and, a side wall 56 formed by a central partition or divider 58 extending through the center of each air transfer passage 34a–d. In the presently preferred embodiment, the floor 50 and ceiling 52 of each runner 48 has a convexly curved shape at the inlet 60 thereof located at the plenum interior 42. That is, the floor 50 of each runner 48 has the same convexly-curved shape as the floor 36 of plenum 32, and the ceiling 52 of each runner 48 is correspondingly shaped at least at the inlet 60 thereof. The opposite, outlet end 62 of each runner 48 extends to one of the tapered arm portions 28, 30 at the sides 20 or 22 of manifold body 12, where a fuel injector boss 64 is positioned atop manifold body 12, as described in more detail below. See FIGS. 1 and 4. Preferably, the cross-sectional area of each runner 48 is substantially constant from the inlet 60 to the outlet 62 thereof.

An important feature of this invention is the presence of an air guide 66 within the interior 42 of plenum 32. The purpose of the air guide 66 is to assist in smoothly transferring air from the inlet 40 of plenum 32 into the inlet 60 of each of the runners 48. The goal is to substantially reduce turbulence within such air flow and obtain as close to a laminar air flow within each runner 48 as possible.

With reference to FIGS. 1–3, 5 and 6, the air guide 66 is formed with an outer surface 67 defined by a base portion 68 coincident with or mounted to at least a portion of the floor 36 of plenum 32, an uppermost portion 70 spaced from the plenum floor 36 and an intermediate portion 72 extending between the base portion 68 and uppermost portion 70. The outer surface 67 of air guide 66 has some what of a complex shape which, generally speaking, may be described as resembling a "mound" wherein the intermediate portion 72 has a generally convexly-curved shape inbetween the base portion 68 and uppermost portion 70 with the cross-section of the air guide 66 decreasing as it extends outwardly from the plenum floor 36, i.e. from the base portion 68 toward the uppermost portion 70. Depending upon the configuration of a specific internal combustion engine, it is contemplated that the plenum 32 will have a slightly larger dimension between sidewalls 38a and 38c than between sidewalls 38b and 38d. As such, the air guide 66 is longer in the direction between plenum sidewalls 38a and 38c and its outer surface 67 is convexly curved more gradually in such direction (FIG. 5) compared to the side-to-side direction between plenum sidewalls 38b, d as depicted in FIG. 6. In any event, the overall height of the air guide 66, e.g. between the plenum floor 36 and the uppermost portion 70 of air guide 66, is always less than the height of the plenum 32 between its floor 36 and inlet 40. Preferably, the height of air guide 66 does not exceed about one-third of the height, or distance between the floor 50 and ceiling 52, of each runner 48. Additionally, the largest transverse dimension of the base portion 68 of air guide 66 preferably is not more than about two-thirds of the largest transverse dimension of the plenum interior 42, i.e. the larger of the distance between sidewalls 38a, c or the distance between sidewalls 38b, d.

Without limiting the generality of characterizing the air guide 66 as having an overall convexly-curved shape from the base portion 68 to the uppermost portion 70, it is contemplated that the outer surface 67 of air guide 66 may take on any one of a number of geometrically definable, curved shapes. Assuming a plane is passed through the intermediate portion 72 of air guide 66, between uppermost portion 70 and base portion 68, it can be appreciated that a surface will be generated or "traced" by the intersection of such plane with the air guide 66. The shape of these surfaces, in turn, can be defined by the formulas noted below which are taken from the text book entitled "Calculus" by Dennis D. Berkey, Copyright 1988, the disclosure of which is incorporated by reference in its entirety herein.

One family of surfaces 76 obtained by the intersection of a plane with the air guide 76 are conic sections, including a circle, an ellipse, a parabola and a hyperbola. Conic sections are graphs of the following equation:

$$Ax^2+Bxy+Cy^2+Dx+Ey+F=0 \qquad (1)$$

Equation (1) is the general second degree equation in two variables x and y which is utilized to derive specific equations for a circle, ellipse, parabola and hyperbola. It is contemplated that the generally convexly-curved configuration of the outer surface 67 of air guide 66, from base portion 68 to uppermost portion 70, can have a configuration such that the surface formed by the intersection of a plane and air guide 66 forms or traces one of the surfaces defined by Equation 1.

Additionally, it is contemplated that the air guide 66 can be formed with a shape such that a number of other surfaces are formed or traced by the intersection of a plane with air guide 66. In particular, it is contemplated that quadric surfaces can be formed thereby which are defined by the general second degree equation noted above, except in three variables x, y and z, as follows:

$$Ax^2+By^2+Cz^2+Dxy+Exz+Fyx+Gx+Hy+Iz+J=0. \qquad (2)$$

The six generally recognized quadric surfaces include ellipsoid, elliptic paraboloid, elliptic cone, hyperboloid of one sheet, hyperboloid of two sheets, hyperbolic paraboloid, and, hyperbolic cylinder. The "trace" or surface formed by the intersection of a plane and air guide 66, can thus take the shape of any one of the above-identified quadric surfaces, and all such configurations of the air guide 66 are considered within the scope of this invention.

Consequently, the term "convexly curved" is meant to generally refer to the overall shape of the outer surface 67 of air guide 66, but also specifically includes any shape of air guide 66 which, when intersected by a plane 74, generates a trace or surface whose shape satisfies either equation 1 and 2 noted above.

As noted above, the inlet 60 of each runner 48 is shaped to generally coincide with the shape of air guide 66 at the entrance thereto. Specifically, at least the floor 50 and ceiling 52 of each runner 48 at its inlet 60 are "radiused" or generally convexly curved so that a smooth transition is provided between the air guide 66 and the entrance to each runner 48. As a result, air entering the plenum interior 42 is smoothly directed with minimal turbulence along the outer surface 67 of air guide 66, and then into each runner 48. A reduction in the turbulence of such air flow, and the promotion of a more laminar flow within each runner 48, substantially increases the efficiency with which the air is transmitted into each cylinder of an associated internal combustion engine. A comparatively large quantity or flow rate of air can thus be provided to the engine at high engine speeds, without sacrificing air flow efficiency at lower engine speeds.

Figure 4:
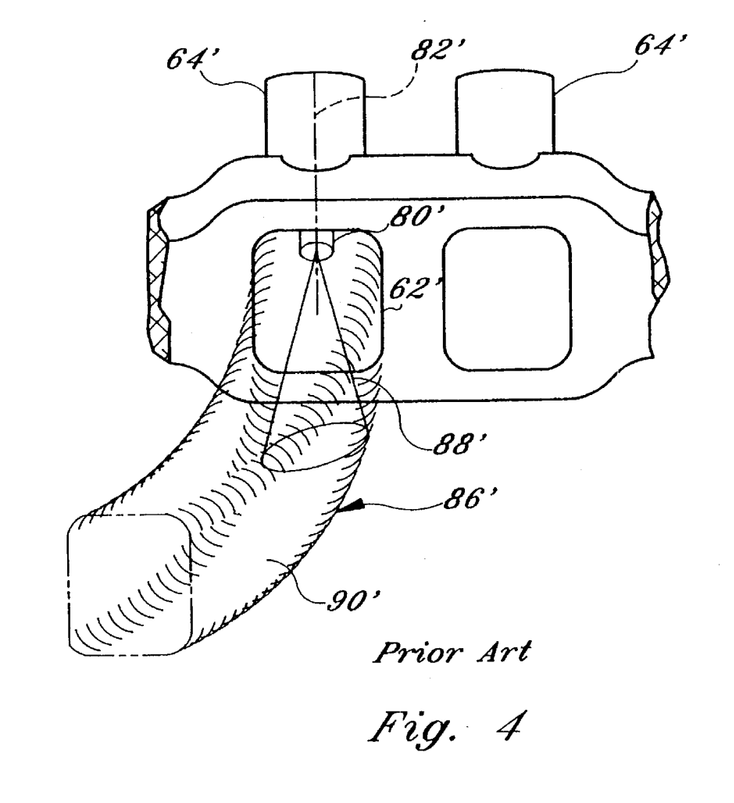
FIG. 4 is a schematic depiction of a portion of a prior art fuel injector system.
Figure 4A:
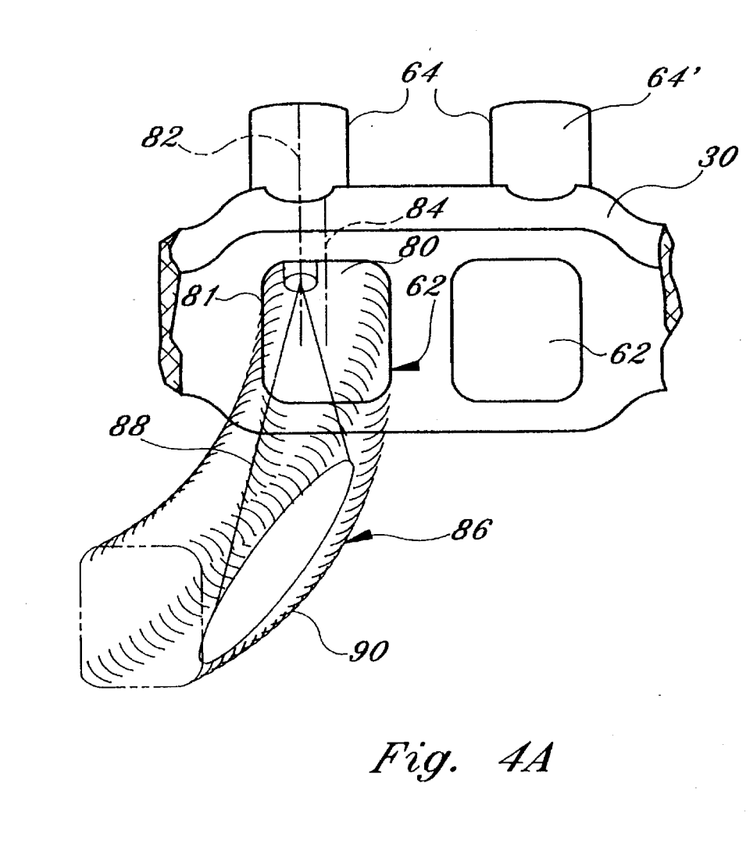
FIG. 4a is a view of a portion of the air intake manifold herein schematically depicting a fuel injector mounted to a boss carried by the manifold.
Figure 5:
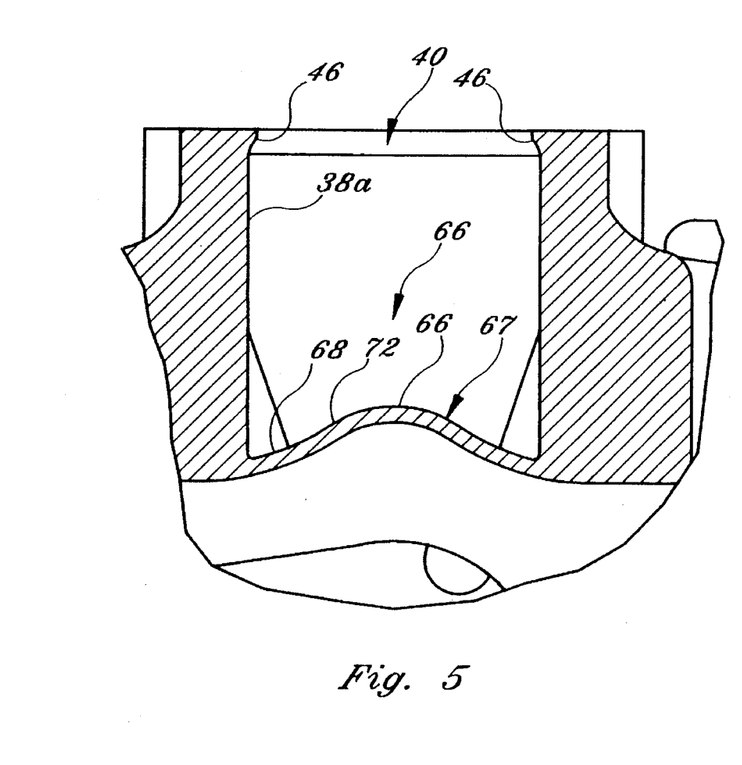
FIG. 5 is a cross-sectional view of a portion of the plenum of the air intake manifold herein illustrating one view of the air guide.

With reference to FIGS. 1, 4 and 4a, another aspect of this invention is illustrated. As noted above, the manifold body 12 is formed with a fuel injector boss 64 at the outlet 62 of each of the runners 48. Each fuel injector boss 64, in turn, mounts a fuel injector (not shown) including an outlet 80, depicted schematically in FIG. 4a, having a centerline 82. In the presently preferred embodiment, each boss 64 is positioned on manifold body 12 such that when the air intake manifold 10 is mounted to the block of an engine (not shown) the centerline 82 of the outlet 80 of each fuel injector is offset from the centerline 84 of the runner outlet 62, and, hence, from the centerline of the cylinder head port 86 a portion of which is depicted schematically in FIG. 4a. This offset of the fuel injector outlet 80 is preferably not more than about 60% of the distance from the centerline 84 of the runner outlet 62 to the sidewall 81 of such outlet 62. The fuel injector outlet 80 discharges a pattern or fan 88 of atomized fuel (gasoline) which is generally conical shaped and has an included angle on the order of about 30°. As shown in FIG. 4a, with the fuel injector outlet 80 offset from the centerline 84 of the runner outlet 62 and cylinder head port 86, the fuel fan 88 extends a substantial distance into the interior of cylinder head port 86 before it contacts a wall 90 thereof. This is in contrast to prior art designs, such as depicted in FIG. 4, where the fan 88' is directed from a fuel injector outlet 80' oriented at the center of the runner outlet 62' and cylinder head port 86'. This arrangement causes the fuel fan 88' to contact the wall 90' of the cylinder head port at a location proximate the runner outlet 62'. It has been found that by directing the fuel pattern or fan 88 well down into the cylinder head port 86, improved combustion is obtained thus producing greater fuel economy and less emissions or combustion by-products compared to the prior art approach shown in FIG. 4. It should be understood that while only two of the bosses 64 are depicted in FIG. 4a, all of the bosses 64 on the manifold body 12 are offset with respect to their associated runner outlet 62 and the outlet of an associated cylinder head port 86 of an internal combustion engine.

While the invention has been described with reference to a preferred embodiment, it should be understood by those skilled in the art that various modifications may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An air intake manifold for an internal combustion engine, comprising:

a manifold body having a plenum, said plenum including a floor, sidewalls and an inlet which define a plenum interior;

an air guide extending from said floor of said plenum toward said plenum inlet, said air guide having a base portion at said floor of said plenum, an uppermost portion and an intermediate portion located between said base portion and said uppermost portion, said intermediate portion having a substantially convexly-curved shape extending from said uppermost portion to said base portion;

a number of runners formed in said manifold body each including a floor, a ceiling and opposed sidewalls which define an inlet at said plenum interior and an outlet adapted to communicate with a cylinder of an internal combustion engine, at least said floor and said ceiling of each runner being formed with a convexly-curved shape at said runner inlet which is substantially the same as said convexly-curved shape of said intermediate portion of said air guide so that air entering said plenum interior is smoothly directed from said inlet of said plenum into said inlet of each of said runners.

2. The air intake manifold of claim 1 in which said plenum inlet is formed with a lip portion having a radiused surface to assist in smoothly directing air toward said air guide and said runner.

3. The air inlet manifold of claim 1 in which said air guide has a height dimension between said base portion and uppermost portion thereof and each of said runners has a runner height dimension extending between said floor and said ceiling thereof, said air guide having a height dimension which is about one-third said runner height dimension.

4. The air inlet manifold of claim 1 in which said plenum interior has a largest transverse dimension between said sidewalls thereof, said base portion of said air guide having a largest transverse dimension which is not more than about two-thirds of said largest transverse dimension of said plenum interior.

5. An air intake manifold for an internal combustion engine, comprising:

a manifold body having a plenum, said plenum including a floor, sidewalls and an inlet which define a plenum interior;

an air guide extending from said floor of said plenum toward said plenum inlet, said air guide having a base portion at said floor of said plenum, an uppermost portion and an intermediate portion extending between said base portion and said uppermost portion, said intermediate portion, when intersected with a plane passing therethrough, forming a surface having the shape of a conic section;

a number of runners formed in said manifold body each including a floor, a ceiling and opposed sidewalls which define an inlet at said plenum interior and an outlet adapted to communicate with a cylinder of an internal combustion engine, at least said floor and said ceiling of each runner being formed with a surface having substantially the same shape as a portion of said conic section which defines said shape of said surface of said intermediate portion of said air guide so that air entering said plenum interior is smoothly directed from said plenum inlet into said inlet of each of said runners.

6. The air intake manifold of claim 5 in which said surface has a shape which is selected from the group consisting of a circle, an ellipse, a parabola and a hyperbola.

7. An air intake manifold for an internal combustion engine, comprising:

a manifold body having a plenum, said plenum including a floor, sidewalls and an inlet which define a plenum interior;

said manifold body being formed with a number of runners each having an inlet at said plenum interior and an outlet which is adapted to communicate with a cylinder of an internal combustion engine;

an air guide extending from said floor of said plenum toward said plenum inlet, said air guide having a base portion at said floor of said plenum, an uppermost portion and an intermediate portion extending between said base portion and said uppermost portion, said intermediate portion, when intersected with a plane passing therethrough, forming a surface having a shape of a quadric surface;

a number of runners formed in said manifold body each including a floor, a ceiling and opposed sidewalls which define an inlet at said plenum interior and an outlet adapted to communicate with a cylinder of an internal combustion engine, at least said floor and said ceiling of each runner being formed with a surface having substantially the same shape as a portion of said quadric surface which defines said shape of said surface of said intermediate portion of said air guide so that air entering said plenum interior is smoothly directed from said plenum inlet into said inlet of each of said runners.

8. The air intake manifold of claim 7 in which said surface has a shape which is selected from the group consisting of an ellipsoid, an elliptic paraboloid, an elliptic cone, the hyperboloid of one sheet, the hyperboloid of two sheets, a hyperbolic paraboloid and a hyperbolic cylinder.

9. An air intake manifold for a fuel-injected, internal combustion engine having multiple cylinders comprising:

a manifold body having a plenum, said plenum including a floor, sidewalls and an inlet which define a plenum interior;

said manifold body being formed with a number of runners each having an inlet at said plenum interior and an outlet which is adapted to communicate with a cylinder of an internal combustion engine;

said manifold including bosses adapted to mount fuel injectors, each of said bosses being located at said outlet of one of said runners and being spaced from one another along a common axis which extends generally transverse to the centerline of each runner outlet, said bosses each having an orientation, when said manifold body is mounted to an internal combustion engine, such that the centerline of the outlet of a fuel injector carried by each boss is offset in a direction along said common axis from the centerline of a cylinder head port of the engine;

an air guide extending from said floor of said plenum toward said plenum inlet, said air guide having a base portion, an uppermost portion and an intermediate portion extending between said base portion and said uppermost portion, said intermediate portion having a substantially convexly-curved shape so that air entering said plenum interior is smoothly directed from said inlet of said plenum into said inlet of each of said runners.

10. The air intake manifold of claim 9 in which each of said runners is formed with a floor, a ceiling and opposed sidewalls which define a cross section at said outlet thereof having a center, each of said bosses being offset with respect to said center of said outlet of an associated runner.

11. The air intake manifold of claim 10 in which the fuel injectors adapted to be carried by said bosses include an outlet which discharges a substantially conical-shaped fan of atomized fuel, said orientation of each of said bosses along said manifold body being such that with the manifold body mounted to an engine, the fan of atomized fuel emitted from said outlet of a fuel injector carried thereby extends a substantial distance into the cylinder head port of the engine before contacting a wall of the cylinder head port.

12. The air intake manifold of claim 9 in which each of said runners includes a floor, a ceiling and opposed sidewalls, at least said floor and said ceiling of each of said runners at said inlet thereof being formed with substantially the same convex curvature as said intermediate portion of said air guide.

13. The air inlet manifold of claim 9 in which said plenum inlet is formed with a lip portion having a radiused surface to assist in smoothly directing air toward said air guide and said runner.

14. The air inlet manifold of claim 9 in which said air guide has a height dimension between said base portion and uppermost portion thereof and each of said runners has a runner height dimension extending between said floor and said ceiling thereof, said air guide having a height dimension which is about one-third said runner height dimension.

15. The air inlet manifold of claim 9 in which said plenum interior has a largest transverse dimension between said sidewalls thereof, said base portion of said air guide having a largest transverse dimension which is not more than about two-thirds of said largest transverse dimension of said plenum interior.

16. The method of introducing a flow of air into the cylinders of an internal combustion engine, comprising:

(a) directing a flow of air into the interior of the plenum of an air intake manifold;

(b) transmitting the air flow over the substantially convexly-curved surface of an air guide which extends from the floor of the plenum toward the plenum inlet, and smoothly guiding the air flow into the inlet of each of a number of runners having a floor and ceiling whose surfaces at said inlet have substantially the same convexly-curved shape as said air guide to obtain an essentially non-turbulent flow of air within each runner.

* * * * *